United States Patent [19]

Cammarata

[11] Patent Number: 4,509,670
[45] Date of Patent: Apr. 9, 1985

[54] SOLDERING STATION WITH AUTOMATIC DROSS REMOVAL

[76] Inventor: Edward Cammarata, 517 SW. 73rd Ave., North Lauderdale, Fla. 33068

[21] Appl. No.: 484,973

[22] Filed: Apr. 14, 1983

[51] Int. Cl.³ .............................................. B23K 1/00
[52] U.S. Cl. .................................... 228/34; 228/36; 228/57; 228/56.2
[58] Field of Search ................... 228/34, 36, 56 A, 57, 228/46, 18

[56] References Cited

U.S. PATENT DOCUMENTS

| 190,888 | 5/1877 | Miller . | |
|---|---|---|---|
| 2,857,878 | 10/1958 | Matson | 228/34 |
| 2,875,717 | 3/1959 | McWilliams | 113/59 |
| 3,040,675 | 6/1962 | Rudolfi | 228/18 |
| 3,359,132 | 12/1967 | Wittman | 228/36 |
| 3,478,878 | 11/1969 | Swaisgood | 210/70 |
| 3,604,611 | 9/1971 | Lamberty | 228/36 |
| 3,958,740 | 5/1976 | Dixon | 228/36 |
| 3,980,219 | 9/1976 | Schmid | 228/34 |
| 4,256,252 | 3/1981 | Huppunen et al. | 228/34 |
| 4,451,000 | 5/1984 | Stephens | 228/57 |

FOREIGN PATENT DOCUMENTS

| 2751913 | 5/1979 | Fed. Rep. of Germany | 228/36 |
|---|---|---|---|
| 3046548 | 7/1982 | Fed. Rep. of Germany | 228/57 |
| 36066 | 2/1982 | Japan | 228/34 |
| 160575 | 10/1982 | Japan | 228/57 |
| 694304 | 10/1979 | U.S.S.R. . | |

OTHER PUBLICATIONS

Western Electric Technical Digest No. 2, Apr., 1966, Hays, Lee & Richardson, p. 7.

Primary Examiner—Nicholas P. Godici
Assistant Examiner—Kurt Rowan
Attorney, Agent, or Firm—Oltman and Flynn

[57] ABSTRACT

A solder station for production dipping of small parts equipped with an automatic dross removal arrangement which consists of a vertically oriented skimmer motor positioned above the solder pot with a long drive shaft extending vertically downward to the pot and a rotating skimmer blade attached to the drive shaft. The skimmer blade rotates slowly and ejects the dross from the top of the solder pot from where it drops down onto a unique sloping dross tray and into a trough from where it may be readily removed. The solder station may be equipped with a forced air filtering system that draws the fumes from the solder pot through a removable filter and expels the filtered air through louvered openings through ducts to the outside. The skimmer motor may be equipped with a friction clutch that prevents damage to the motor in case the rotation of the skimmer should be obstructed. The solder station may have an auxilliary power outlet and thermostatic control of the solder pot temperature. The solder station may also have leg extenders for improved stability and built-in illumination of the work surface.

15 Claims, 3 Drawing Figures

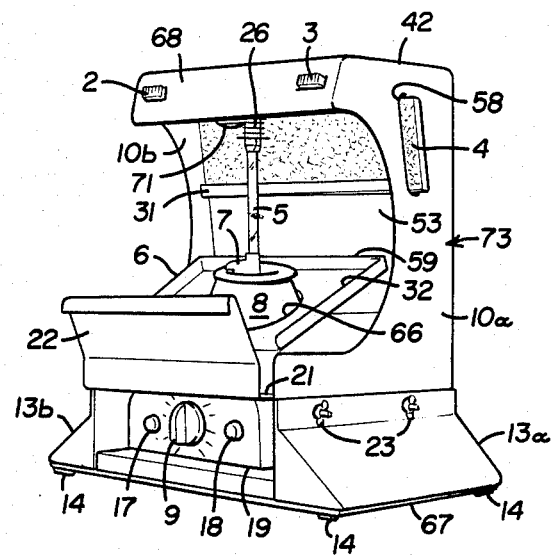
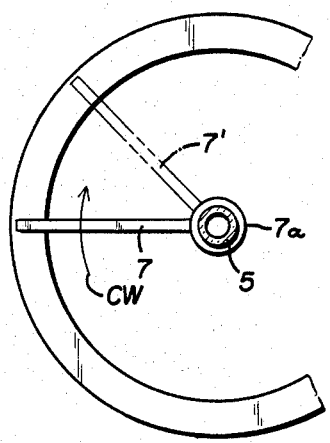
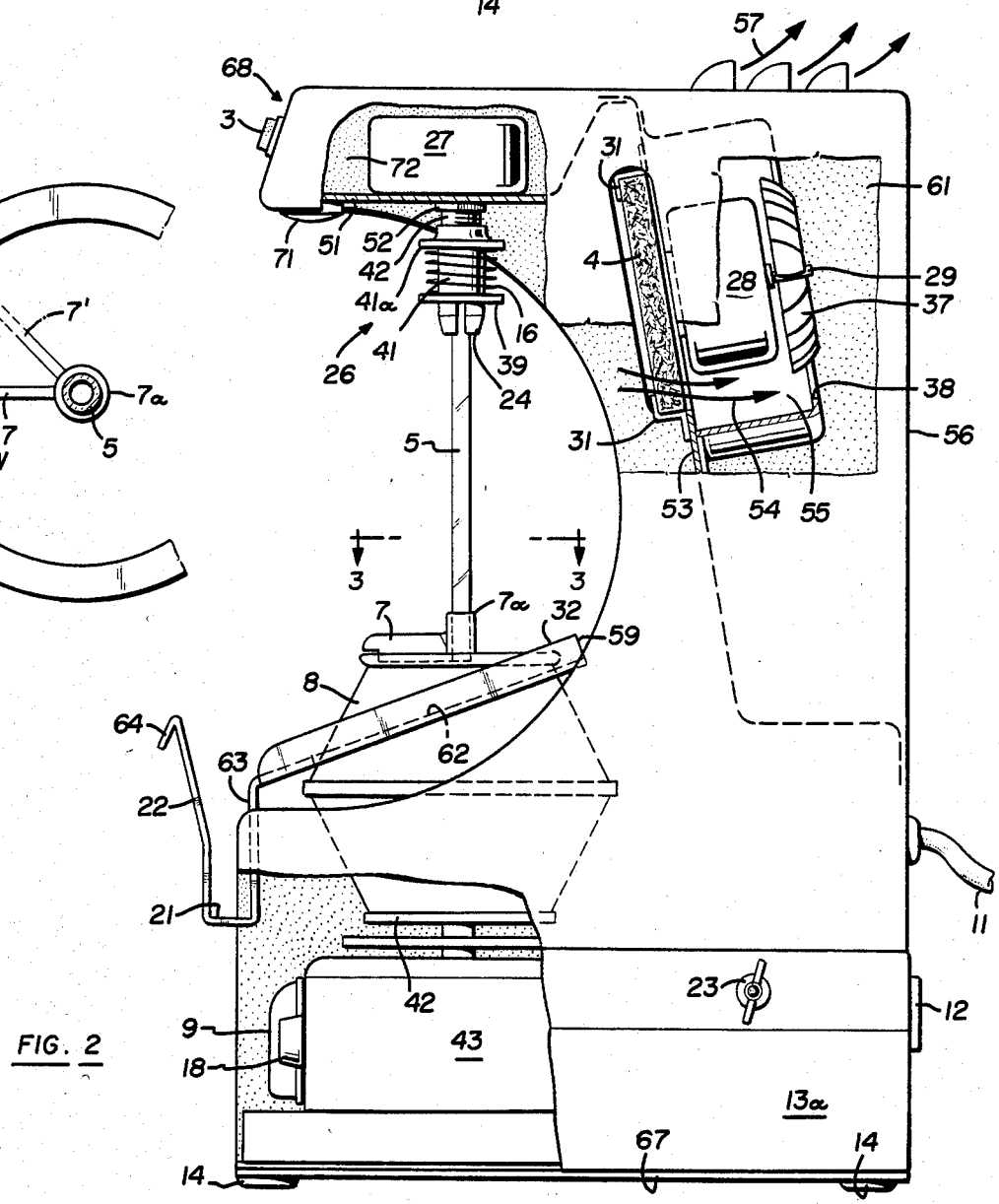

SOLDERING STATION WITH AUTOMATIC DROSS REMOVAL

The invention belongs to work station apparatus used for soldering and tinning of small parts and components as used in an assembly line production process.

In many production processes, especially those involving small electrical parts, the assembly of these parts and their interconnection, when part of an assembly line process is most often done by means of dipping in a molten tin-lead alloy, known as solder alloy or simply solder contained in a suitable vessel where the solder alloy is maintained at a preset suitable temperature by thermostatically controlled heating elements.

The dip-soldering process, in order to provide good and reliable bonds between the components to be assembled requires that the molten solder alloy is clean and free of tin and lead oxides that develops in the form of a skin, also called "dross", on the surface of the molten hot solder alloy, where it is exposed to atmospheric air. It is therefore necessary that the solder alloy be kept free of dross at all times during tinning operations, or else the soldered connections may not yield good electrical contacts or good mechanical bonds.

Inventors have, in the past aimed at providing means for keeping the solder alloy in the dip-soldering process free of dross.

Russian Pat. No. SU0694304 issued in October, 1979 describes solder-dip apparatus comprising a turntable with a large solder bath with a bath inside for solder and flux and scrapers for cleaning the surface of the solder.

U.S. Pat. No. 3,980,219 by Schmid issued Sept. 14, 1976 discloses a vessel containing molten solder and a movable mechanically driven cover that also includes a slag stopper that removes the slag skin or dross from the molten solder surface.

U.S. Pat. No. 2,875,717 by J. D. McWilliams issued Mar. 3, 1959 discloses a method of inserting the component to be dip-soldered into the molten mass of solder such that the dross is pushed away in the dipping process.

U.S. Pat. No. 190,888 by H. Miller issued May 15, 1877 discloses a basic dip-soldering machine for cans and the like.

The present invention discloses a novel construction of a work station for dip-soldering and dip-tinning of small parts. It is novel in that it embodies advantages that are especially valuable as part of a production line work station.

It is a primary object of the invention to provide a solder pot that offers automatic dross removal from the surface of the molten solder metal.

It is another primary object to provide a solder station that is transportable and relatively small in size and of relatively light weight so that it can be integrated into automated production lines.

It is still another object to provide a solder station that is self-contained with illumination of the work area so that a production line operator can safely, and less subject to fatigue, insert and remove parts to be dipped in the solder.

It is still another object to provide a solder station that has built-in exhaust facilities for removal of noxious fumes from the dip solder operation.

It is still another object to provide a solder station that has protection against breakage of the dross-removal drive train.

It is still another object to provide a solder station that is heat insulated at the underside so that it can be located anywhere atop a bench or along a production line without burning or scorching the top of the bench or the production line surface material.

It is still another object of the invention to provide a solder station that is protected against accidental and dangerous tip-over or over fill of the station apparatus.

It is still another object to provide a solder station that has thermal protection of the bearings in the motor operating the dross-removal drive train, to insure long motor life.

It is still another object to provide a solder station that includes an auxilliary electric power outlet to power other solder stations or electric hand tools and the like to be used in connection with the operation of the solder station.

It is still another object to provide a solder station that maintains the molten solder metal at a constant temperature.

It is still another object of the invention to provide a solder station that is constructed with materials and methods that are readily available and adaptable to mass production.

Other advantages of the invention will become clear in the course of the following description with appended drawings and claims.

BRIEF DESCRIPTION OF THE DRAWINGS

FIG. 1 is a perspective view of the solder station, showing the major elements of the invention;

FIG. 2 is a vertical part cross-sectional side view of the solder station, showing its major elements;

FIG. 3 is a horizontal top-down view of the solder pot seen along the line 3—3 of FIG. 2, showing the skimmer and its drive shaft in cross-section.

DETAILED DESCRIPTION

FIG. 1 shows generally the front and right hand side of the solder station in a perspective view. A cabinet 73 supports and contains the individual elements of the invention. FIG. 2 shows the solder station in a vertical part cross-sectional view, seen from the right hand side. Part of the right hand cabinet side panel is shown with a section broken away to show some of the internal components.

A circular solder pot 8, disposed atop a heating element 42 contains molten solder metal filling it to the top. A rotary skimmer blade 7 is attached by means of a bushing 7a to a vertical heat insulating cylindrical drive shaft 5 which acts as a heat decoupler. The shaft is inserted into the two jaws 24 of a friction clutch, generally at 26. The friction clutch with its main body 41 is in turn attached to a motor 27, housed in an upper enclosure 72 of the cabinet 73 and insulates the bearings of motor 27 from the heat of the molten metal.

The friction clutch 26, as stated above, consists of a cylindrical, vertical main body 41, extending into a circular, upper horizontal collar 41a. A helical compression spring 16 disposed coaxially with the shaft rests at its upper end against the lower surface of the collar 41a and presses downward against a loosely seated washer 39 which, with the rim of its inner opening presses inward against the inward tapered conical outer surface of the jaws 24 so that they hold the upper end of the shaft 5 in a grip, that is firm enough to turn the shaft under normal operating conditions, but not so firm that the motor and clutch body will suffer damage or break the shaft 5 or skimmer blade 7 in the case of resistance or in case the molten solder metal is not sufficiently hot.

A threaded bushing 42 which is part of the motor 27 serves to hold the motor attached to the inner horizontal cabinet panel 51 by means of the nut 52.

An exhaust filter 4, containing loosely packed filter medium, is attached by two horizontal filter flanges 31 to an inner back panel 53. The back panel has filter openings that are covered by the filter 4 so that fumes rising from the solder pot 8 are drawn through the filter 4 as shown by arrows 54 by a fan motor 28 with a rearward facing fan with fan blades 29, attached to the rearward projecting fan motor shaft 37. The fan is disposed in a circular fan opening 38 that is cut out from the rear wall of a fan motor enclosure generally at 55.

The fan motor enclosure 55 is situated inside a rear cabinet compartment generally at 61 and defined by the cabinet rear panel 56, the two cabinet side panels 10a and 10b and the inner rear panel 53. The rear cabinet compartment 61 is in turn vented to the outside through louvered openings 1 atop the cabinet. The louvered openings 1 admit the filtered air streams shown by arrows 57 and directs it upward and rearward away from the production line operator.

The filter 4 may be any suitable type of air filter of which there are many known constructions. Some contain a filter medium consisting of compacted glass fibers that may be impregnated by a suitable wetting agent or it may contain activated charcoal granules which are especially well suited for absorption of noxious fumes. The filter may also be of the resuable type that can be washed and cleaned before reuse. The filter extends a short distance outside the right hand side panel 10a through the filter slot 58 so that the filter, when spent, can be removed and replaced with a new filter.

A dross capturing tray is disposed around the solder pot 8 so that it can capture the dross ejected from the top of the pot by the rotating skimmer 7 or by over fill. The dross capturing tray, also designated the dross tray, for short, consists of a downward sloping main panel 62 with upward bent side flanges 6 and 32 to the right and left hand side respectively and 59 to the rear. The dross tray main panel 62 has a generally centrally disposed opening 66 that admits the upper part of the solder pot 8 through said opening.

Dross falling off the edges of the pot falls down the sloping dross tray main panel 62 and into the trough 21 formed by a vertical downward projecting extension 63 of the dross tray main panel 52 and a forward facing front panel 22 with an upper "rolled-over" lip 64. The trough 21 is open to the sides so that accumulated dross may be swept out to one side and discarded.

The solder station according to the invention may have horizontally extending leg extenders 13a and 13b extending to the right and left hand side respectively. These extenders provide increased lateral stability of the solder station and act as heat sinks. At least four downward facing rubber pads 14 attached to the underside of the leg extenders and/or the solder station proper, further serve to increase the stability and provides an airspace between the underside of the solder station and the desk top surface on which it is resting, so that the heat from the solder pot does not penetrate downward into the desk top. Additional insulation 67 may be provided in the form of a horizontal sheet of suitable heat insulating material such as masonite or the like, attached to the underside of the solder station and the leg extenders 13a and 13b.

The leg extenders may be detachably attached to the sides of the cabinet by means of screws with wing nuts 23.

Electric power is connected to the solder station through an electrical power cord 11 extending from the rear of the cabinet. An ON/OFF switch 2 labeled "BLADE" is mounted to the left hand side of an upper control panel generally at 68. This switch controls the start and stop of the skimmer motor 27. A similar switch 3 labeled "VENT" controls the start and stop of the fan motor 27 and is mounted on the right hand side of the control panel 68. Electrical power to the heating element 42 is thermostatically controlled by a thermostat control knob 9 mounted in the middle of a lower control panel 19. This knob also serves to turn on or off the heating element 42. An electrical fuse with fuse holder 17 is mounted to the left of the control knob 9 and a pilot light 18 to the right of the knob indicates by light-on that power is connected to the solder station. An auxilliary extension outlet 12 mounted in the rear cabinet panel 56 is connected to the power cord 11 and serves to provide electric power for additional solder stations or electric hand tools as may be needed on the production line near the solder station. An electric apparatus chassis 43 in the bottom part of the cabinet contains part of the electric wiring, the thermostat for the heating element 42 and its associated components. The details of the electric wiring connections are not shown since these will be obvious to anyone skilled in the art of electrical wiring and the invention is not directed to the method of wiring per se.

OTHER EMBODIMENTS

The invention has above been described in detail in a preferred embodiment in reference to the appended drawings. It is to be understood that the invention is capable of other embodiments that are obvious to those skilled in the art to which it pertains. The terminology used is for description and is not to be limiting.

In another embodiment, the solder station is vented to the outside environment through a suitable air duct attached to the top of the cabinet louvered openings.

In still another embodiment, the rotational speed of the skimmer motor may be selectively controllable by means of a speed control knob suitably mounted externally on the cabinet. In still another embodiment, the skimmer motor may be arranged to perform a sweep of the skimmer at selectively controllable intervals by means of suitable timing apparatus included in the construction of the electrical circuit. Such timing apparatus are well known and used in several forms in the electric apparatus industry. (not shown)

In still another embodiment, the solder station may include illumination of the solder pot by means of one or more lights built into the cabinet. Such a light is shown as 71, where it is disposed above the solder pot facing downward, so as to conveniently illuminate the work area. The light may be controlled by an on/off switch of its own, or by the fan motor switch 3.

I claim:

1. A solder station for production dipping of small parts in molten solder metal, comprising in combination:
    a solder pot with heating element containing solder metal;
    automatic dross skimmer means;
    dross collection tray means; and power for said solder pot and for said automatic dross skimmer means;

said dross collection tray means comprises a downward sloping dross tray main panel having a generally centrally located opening that admits the upper part of said solder pot, said dross tray main panel having an upper rear edge and two side edges, said edges having vertical flanges, and a lower front edge, said front edge extending generally vertically downward as a vertical extension, a forward facing generally vertical front panel, said vertical extension and said front panel mutually attached at their lower edges and forming a dross trough, said dross trough open at at least one of the sides.

2. A solder station for production dipping of small parts, as defined in claim 1 further comprising:
forced air filter means.

3. A solder station for production dipping of small parts, as defined in claim 2, further comprising a metal cabinet, said cabinet having legs, and further comprising:
leg extender means, said leg extender means serving to prevent accidental tipping of said cabinet.

4. A solder station for production dipping of small parts, as defined in claim 3, wherein said automatic dross skimmer means further comprises:
a dross skimmer motor;
at least one skimmer blade partly immersed in said molten solder metal;
drive shaft means extending from said skimmer motor to said solder pot, operatively imparting to said skimmer blade and to said solder pot relative rotational motion, so that said skimmer blade, moving in relation to said solder pot skims dross from the surface of said molten metal contained in said solder pot.

5. A solder station for production dipping of small parts, as defined in claim 4, wherein said automatic dross skimmer motor is disposed generally vertically above said solder pot and wherein said drive shaft means comprise a skimmer motor drive shaft and wherein:
said drive shaft extends vertically downward from said motor to said solder pot; and wherein
said skimmer blade extends horizontally from the lower end of said drive shaft, said skimmer blade partly immersed in said molten solder metal, said skimmer blade operating to skim dross from the surface of said molten solder metal and ejecting it from the top of said solder pot as said skimmer blade slowly rotates about the axis of said drive shaft.

6. A solder station as defined in claim 5 further comprising:
a friction clutch, said clutch interposed between said skimmer motor and said skimmer blade and disposed coaxially with and attached to said drive shaft such that said drive shaft is divided into an upper drive shaft section disposed between said motor and said clutch and a lower drive shaft section disposed between said clutch and said skimmer blade and further such that said motor is capable of turning said upper drive shaft section without turning said skimmer blade by overcoming the friction of said friction clutch, in case said skimmer blade is restrained from turning.

7. A solder station as defined in claim 6 wherein said lower drive shaft section is constructed from a heat insulating material that prevents heat transfer from said solder pot to said motor.

8. A solder station for production dipping of small parts as defined in claim 1 further comprising forced air filter means, said forced air filter means comprising:
a fan motor and fan;
a detachable air filter;
louvered exhaust openings;
said air filter disposed generally above said solder pot;
said fan disposed generally behind said air filter;
said louvered exhaust openings disposed generally behind said fan such that fumes emitting from said solder pot are drawn by said fan through said filter and retained therein and such that filtered air is expelled through said louvered exhaust openings.

9. A solder station for production dipping of small parts, as defined in claim 8, further comprising air duct means interposed between said louvered exhaust openings and the exterior environs.

10. A solder station for production dipping of small parts, as defined in claim 8 wherein said air filter is a washable, reusable air filter.

11. A solder station for production dipping of small parts, as defined in claim 4, wherein said electric power means comprises:
on/off switch for said dross skimmer motor.

12. A solder station for production dipping of small parts as defined in claim 8 wherein said electric power means further comprises:
on/off switch for said fan motor; and
thermostatic control for said solder pot heating element.

13. A solder station for production dipping of small parts, as defined in claim 1, wherein said electric power means further comprises:
an electric power cord; and
at least one auxilliary power outlet attached to said solder station and electrically connected to said power cord.

14. A solder station for production dipping of small parts as defined in claim 3, wherein said cabinet has on its underside attached thereto, heat insulating material which prevents transfer of radiant heat to the supporting surfaces.

15. A solder station for production dipping of small parts as defined in claim 1 further comprising at least one built-in light for illumination of the surface of the solder pot.

* * * * *